United States Patent
Chung et al.

(10) Patent No.: US 7,202,931 B2
(45) Date of Patent: Apr. 10, 2007

(54) LIQUID CRYSTAL DISPLAY DEVICE AND METHOD OF MANUFACTURING THE SAME COMPRISING A PLURALITY OF SEAL PATTERNS BETWEEN A PLURALITY OF SUPPORTING PATTERNS AND A PLURALITY OF COMPENSATING PATTERNS DISPOSED BELOW AND ALIGNED WITH THE PLURALITY OF SUPPORTING PATTERNS

(75) Inventors: Hyun-Sang Chung, Gyeonggi-do (KR); Young-Suk Park, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 93 days.

(21) Appl. No.: 10/826,264

(22) Filed: Apr. 19, 2004

(65) Prior Publication Data

US 2004/0233376 A1    Nov. 25, 2004

(30) Foreign Application Priority Data

May 20, 2003  (KR) ...................... 10-2003-0031807

(51) Int. Cl.
*G02F 1/1339*   (2006.01)
(52) U.S. Cl. ..................... 349/153; 349/155; 349/106; 349/190
(58) Field of Classification Search .............. 349/153, 349/155, 106, 190, 187, 156
See application file for complete search history.

(56) References Cited

U.S. PATENT DOCUMENTS

| | | | |
|---|---|---|---|
| 6,222,603 B1* | 4/2001 | Sakai et al. ................ | 349/153 |
| 6,414,733 B1* | 7/2002 | Ishikawa et al. ........... | 349/110 |
| 6,476,895 B1 | 11/2002 | Kwak et al. | |
| 6,570,639 B1* | 5/2003 | Manabe et al. ............ | 349/190 |
| 6,705,584 B2* | 3/2004 | Hiroshima et al. ......... | 249/155 |
| 2001/0033356 A1* | 10/2001 | Yanagawa et al. ......... | 349/153 |
| 2002/0063837 A1* | 5/2002 | Lee ............................. | 349/153 |
| 2002/0196393 A1* | 12/2002 | Tashiro et al. ............. | 349/106 |

FOREIGN PATENT DOCUMENTS

KR    2001-0057024 A    7/2001

* cited by examiner

*Primary Examiner*—Dung T. Nguyen
*Assistant Examiner*—Thoi V. Duong
(74) *Attorney, Agent, or Firm*—Birch, Stewart, Kolasch and Birch, LLP

(57) ABSTRACT

A liquid crystal display device includes a first substrate having a first region and a second region, wherein the second region surrounds the first region, a plurality of patterned spacers over the first substrate in the first region, a plurality of supporting patterns spaced apart from each other over the first substrate in the second region, a seal pattern in the second region including the plurality of supporting patterns, a second substrate spaced apart from and attached to the first substrate by the seal pattern, and a liquid crystal layer between the first and second substrates.

34 Claims, 7 Drawing Sheets

(RELATED ART)

LIQUID CRYSTAL DISPLAY DEVICE AND METHOD OF MANUFACTURING THE SAME COMPRISING A PLURALITY OF SEAL PATTERNS BETWEEN A PLURALITY OF SUPPORTING PATTERNS AND A PLURALITY OF COMPENSATING PATTERNS DISPOSED BELOW AND ALIGNED WITH THE PLURALITY OF SUPPORTING PATTERNS

This application claims the benefit of Korean Patent Application No. 2003-31807, filed on May 20, 2003 in Korea, which is hereby incorporated by reference.

BACKGROUND OF THE INVENTION

1. Field of the Invention

The invention relates to a liquid crystal display (LCD) device and more particularly, to a liquid crystal display device having an improved seal pattern and a method of manufacturing the same.

2. Discussion of the Related Art

Liquid crystal display (LCD) devices are image display devices that utilize the tendency of liquid crystal molecules to align according to an applied voltage. The LCD devices generally include an upper substrate upon which a color filter is formed, a lower substrate upon which a plurality of thin film transistors are formed, and a liquid crystal layer interposed between the upper and lower substrates. The LCD devices display images by controlling changing orientations of the liquid crystal molecules by applying voltage pulses to pixel and common electrodes.

A manufacturing process of the LCD devices includes a thin film transistor array process for forming the lower substrate, an upper substrate forming process, and a liquid crystal cell process. During the thin film transistor array process, a plurality of gate and data lines are formed on a substrate, and a plurality of thin film transistors are formed at crossing portions of the gate and data lines. Then, a pixel electrode is formed in a pixel region of the lower substrate. During the upper substrate forming process, a color filter, a black matrix, and a common electrode are sequentially formed on a substrate. The liquid crystal cell process includes forming an alignment layer, a rubbing process, a cleaning subsequent to the rubbing process, attaching the upper and lower substrates, and injecting the liquid crystal material. The aforementioned liquid crystal cell process will be described more in detail hereinafter with reference to FIG. 1.

FIG. 1 shows a flow chart of a manufacturing process of an LCD device according to the related art.

At step ST1, a first substrate, which has a thin film transistor and a pixel electrode, and a second substrate, which has a color filter layer and a common electrode, are prepared.

Step ST2 forms first and second alignment layers on the pixel electrode and the common electrode, respectively. Step ST2 includes coating a thin polymer film and rubbing the thin polymer film. The thin polymer film may be commonly referred to as an alignment layer. The thin polymer film must be uniformly formed, and the rubbing process must also be performed uniformly on the thin polymer film. The initial orientation of the liquid crystal molecules is determined by the rubbing. The liquid crystal molecules are normally oriented the rubbing of the alignment layer to display a uniform picture. Polyimide may be widely used as a material of the thin polymer film.

Step ST3 forms a seal pattern on either the first substrate or the second substrate. The formation of the seal pattern includes forming a cell gap to allow for injection of the liquid crystal material between the substrates. In addition, the seal pattern prevents the injected liquid crystal material from leaking outside the seal pattern. The seal pattern is commonly fabricated using a screen-printing method or a dispensing method by mixing sealant of thermosetting resin with glass fiber.

During step ST4, spacers are sprayed on one of the first and second substrates to maintain a precise and uniform gap between the first and second substrates. The spacer spray method can be divided into two different types: 1) a wet spray method that involves spraying a mixture of alcohol and spacer material, and 2) a dry spray method that involves spraying spacer material alone.

Here, the seal pattern and the spacers are formed on different substrates. For example, the seal pattern may be formed on the second substrate, which has a relatively even surface, and the spacers may be formed on the first substrate, which functions as a lower substrate of the liquid crystal display device.

During step ST5, the first and second substrates are aligned and then are attached to each other along the seal pattern. The alignment accuracy of the substrates is decided by a margin, and an aligning accuracy of several micrometers is required because light leakage occurs if the substrates are misaligned beyond that margin.

Step ST6 divides the attached substrates into unit cells. The cell cutting process includes a scribing process that forms cutting lines on a surface of the substrate using a diamond pen or a cutting wheel of tungsten carbide, the hardness of which is higher than the hardness of the glass substrate. A breaking process divides the unit cells by using force.

Step ST7 entails injecting a liquid crystal material between two substrates of the unit cells. Each unit cell has an area of several square centimeters and a gap of several micrometers. A vacuum injection method using a pressure difference between the inside and outside of the unit cells is commonly used as an effective injection method.

After finishing the liquid crystal material injection, an injection hole is sealed to prevent leakage of the liquid crystal material. Generally, a ultra violet (UV) curable resin is deposited onto the injection hole by a dispenser, and ultra violet light is then irradiated onto the resin to thereby harden the resin and seal the injection hole. Polarization films are attached on outer surfaces of the unit cell, and a driving circuit is connected to the unit cell using an attachment process.

FIGS. 2A and 2B show processes of forming a seal pattern according to the related art. FIG. 2A shows a seal pattern forming process using a screen-printing method, and FIG. 2B shows another seal pattern forming process using a dispensing method.

FIG. 2A shows a screen 12 that may include a pattern having a specific shape formed thereupon. A squeegee 14 may be used for scrubbing sealing material onto the screen 12. A seal pattern 16 forms on a substrate 10 by scrubbing the sealing material onto the screen 12 using the squeegee 14, for example. The seal pattern may accordingly include formation of a cell gap for subsequent injection of liquid crystal material to thereby prevent the injected liquid crystal material from leaking out of the liquid crystal cell. The seal pattern 16 forms along edges of the substrate 10 and may include at least one injection hole 18 formed at one side thereof.

The seal pattern forming process may include at least two processes. The first process may include formation of the seal pattern 16 on the substrate 10 by scrubbing the sealing material onto the screen 12. Then a second process may include evaporating solvents contained in the sealing material to thereby dry the sealing material.

The thickness of the seal pattern is closely associated with the cell gap of the liquid crystal display device, and it is therefore important to form the seal pattern to have a uniform thickness and height.

The screen-printing method finds wide use due to its convenience, but it is difficult to use on a large substrate. Additionally, the dispensing method applies sealing material onto an entire surface of the screen, followed by scrubbing by the squeegee, and a large amount of sealing material may therefore be consumed.

To solve the above-mentioned problem, a dispensing method that selectively forms the seal pattern only at a desired region, has been gradually adopted. FIG. 2B shows an apparatus for the dispensing method that may include a dispenser 24, a table 20, and a substrate 22 placed on the table 20, wherein the dispensing method may include a syringe for dispensing the sealing material. For example, the seal pattern 26 may be formed by filling the sealing material into the dispenser 24, and then dispensing the sealing material onto the substrate 22 by applying pressure to the syringe while simultaneously moving the dispenser 24 or the table 20. Accordingly, sealing material may be dispensed that has a uniform width and thickness.

As discussed above, the seal pattern may be formed along edges of the substrate, and liquid crystal material is injected into the seal pattern through the injection hole of the seal pattern. Thus the related art seal pattern directly contacts the liquid crystal material.

FIG. 3 shows a cross-sectional view of a liquid crystal display device according to the related art.

FIG. 3 shows first and second substrates 30 and 50 that are spaced apart from and facing each other. A thin film transistor T, which is composed of a gate electrode 32, a semiconductor layer 34, a source electrode 36 and a drain electrode 38, is formed on an inner surface of the first substrate 30. A passivation layer 42 is formed to cover the thin film transistor T. The passivation layer 42 has a drain contact hole 40 exposing a part of the drain electrode 38. A pixel electrode 44 is formed on the passivation layer 42 and connects to the drain electrode 38 through the drain contact hole 40. A first alignment layer 46 is formed to cover the pixel electrode 44.

A black matrix 52 is formed on an inner surface of the second substrate 50 and corresponds to the thin film transistor T of the first substrate 30. A color filter layer 54 is formed on the black matrix 52. A common electrode 56 and a second alignment layer 58 are sequentially formed on the color filter layer 54.

The color filter layer 54, the common electrode 56 and the first and second alignment layers 46 and 58 are formed only in a display region C, which is defined as an area for displaying a picture. Although not shown in FIG. 3, the pixel electrode 44 and the common electrode 56 may extend into a non-display region D so as to electrically connect the substrates 30 and 50.

A seal pattern 60 is formed in the non-display region D, outside the display region C, to attach the substrates 30 and 50. A liquid crystal layer 70 is interposed in the seal pattern 60 between the substrates 30 and 50.

In the related art, a small amount of glass fiber is mixed in to serve as a supporter of the sealant. However, the glass fiber causes bubbles during the blending process of mixing the glass fiber with the sealant. Also, glass fiber is abrasive, and in the dispensing method, the life span of the dispenser shortens due to the glass fiber abrasion.

SUMMARY OF THE INVENTION

Accordingly, the invention is directed to a liquid crystal display (LCD) device including a seal pattern and a method of manufacturing the same that substantially obviates one or more of problems due to limitations and disadvantages of the related art.

An object of the invention is to provide a liquid crystal display device including a seal pattern that prevents bubbles and lengthens the life span of a printing apparatus for the seal pattern.

Another object of the invention is to provide a method of manufacturing a liquid crystal display device including a seal pattern that reduces manufacturing costs.

The invention, in part, pertains to a liquid crystal display device that includes a first substrate having a first region and a second region, wherein the second region surrounds the first region, a plurality of patterned spacers on the first substrate in the first region, a plurality of supporting patterns spaced apart from each other on the first substrate in the second region, a plurality of seal patterns in the second region including a plurality of supporting patterns, a second substrate spaced apart from and attached to the first substrate by the seal pattern, and a liquid crystal layer between the first and second substrates.

In the invention, the device can further contain a color filter layer between the first substrate and the plurality of patterned spacers, wherein the color filter layer is composed of red, green and blue sub-color filters. Also, a plurality of step-compensating patterns can be formed between the first substrate and the plurality of supporting patterns, and the plurality of step-compensating patterns can be formed of the same material as the color filter layer. The device can further have a black matrix between sub-color filters, and the plurality of patterned spacers correspond to the black matrix. A common electrode can be between the patterned spacers and the color filter layer.

The inventive device can additionally contain a plurality of conductive material patterns between the supporting patterns and the first substrate, wherein the plurality of conductive material patterns are formed of the same material as the common electrode. An array element layer can be formed over an inner surface of the second substrate, wherein the array element layer includes a pixel electrode. Also, an array element layer can be found over the second substrate, wherein the array element layer includes a pixel electrode and a common electrode. The plurality of supporting patterns can be formed from the same material and through the same process as the plurality of patterned spacers. The thickness of the liquid crystal layer can define a cell gap, which is determined by thicknesses of the patterned spacers and the supporting patterns. Further, the supporting patterns act as a supporter of the seal pattern, and the seal patterns can contain no glass fibers.

The invention, in part, pertains to a method of manufacturing a liquid crystal display that includes forming a plurality of patterned spacers in a first region and a plurality of supporting patterns in a second region on a first substrate, wherein the second region surrounds the first region, forming a plurality of seal patterns in the second region including the plurality of supporting patterns, disposing the first substrate over a second substrate and attaching the first and second substrate by using the seal pattern, and injecting a liquid crystal material between the first and second substrates.

In the inventive method, a cell gap can be defined by a thickness of the liquid crystal layer, and is determined by thicknesses of the patterned spacers and the supporting patterns. The method can include a step of forming a color filter layer before forming the plurality of patterned spacers and supporting patterns, wherein the color filter layer is composed of red, green and blue sub-color filters. The method can also include a step of forming a plurality of step-compensating patterns before forming the plurality of patterned spacers and supporting patterns, wherein a plurality of compensating patterns are spaced apart from each other. The forming the plurality of compensating patterns can be simultaneously performed with forming the color filter layer. Also, the plurality of compensating patterns can correspond to the plurality of supporting patterns.

The inventive method can further include forming a black matrix before forming the color filter layer, wherein the black matrix corresponds to an interface between the sub-color filters. The seal pattern can be formed by one of a screen-printing method and a dispensing method. The seal patterns can be disposed between adjacent step-compensating patterns and between adjacent supporting patterns. Also, the seal patterns can contain no glass fibers.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

Reference will now be made in detail to embodiments of the invention, examples of which are illustrated in the accompanying drawings.

Figure 1:
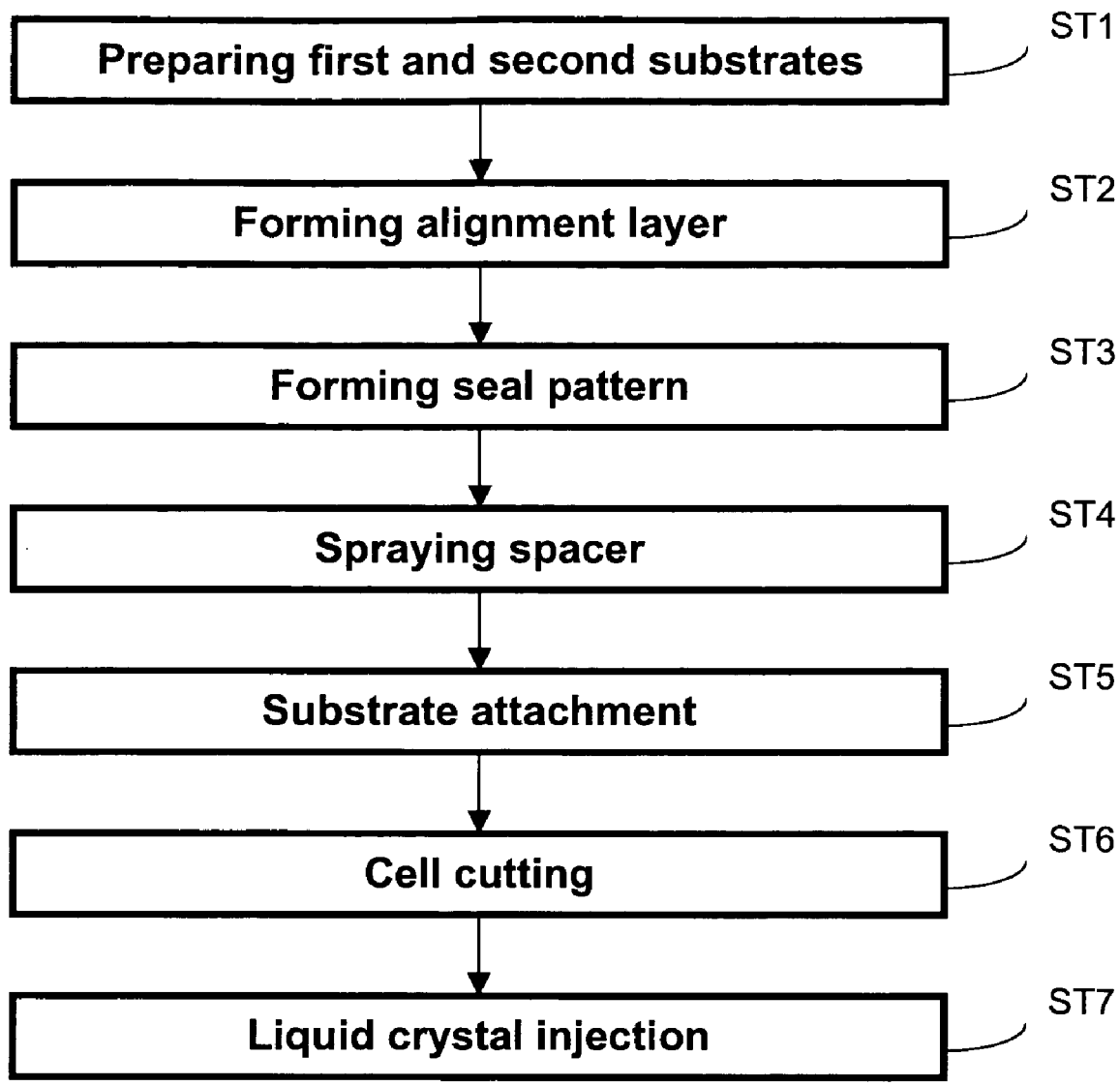
FIG. 1 shows a flow chart showing a manufacturing process of an LCD device according to the related art.
Figure 2A:
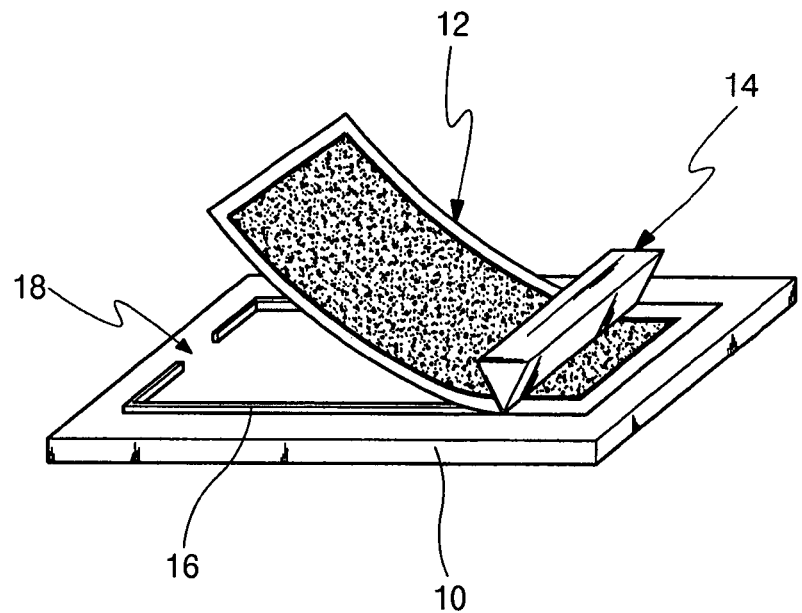
FIGS. 2A and 2B show processes of forming a seal pattern according to the related art.
Figure 2B:
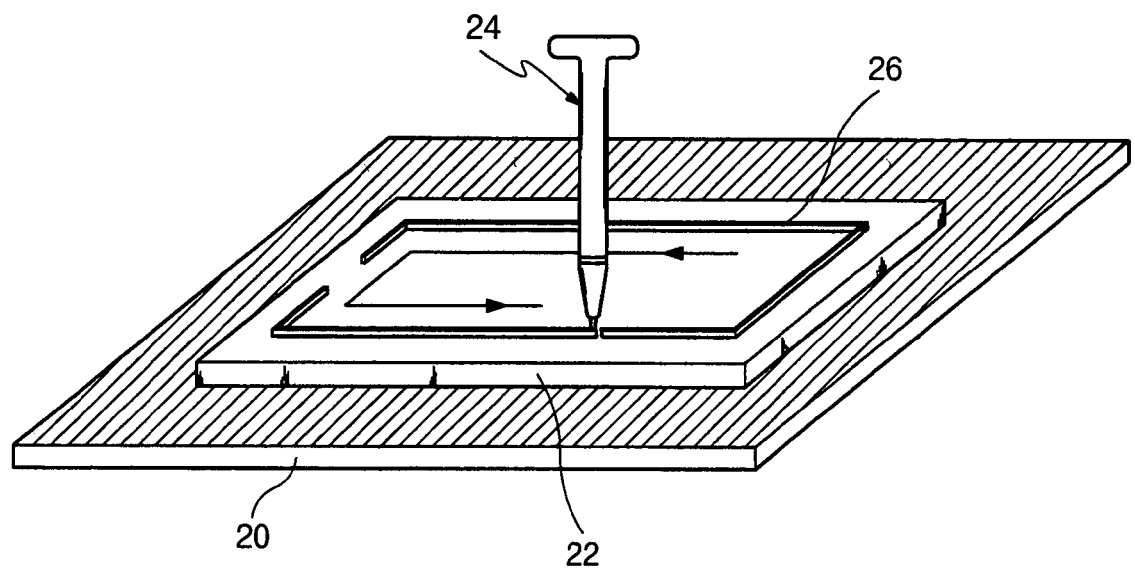
Figure 3:
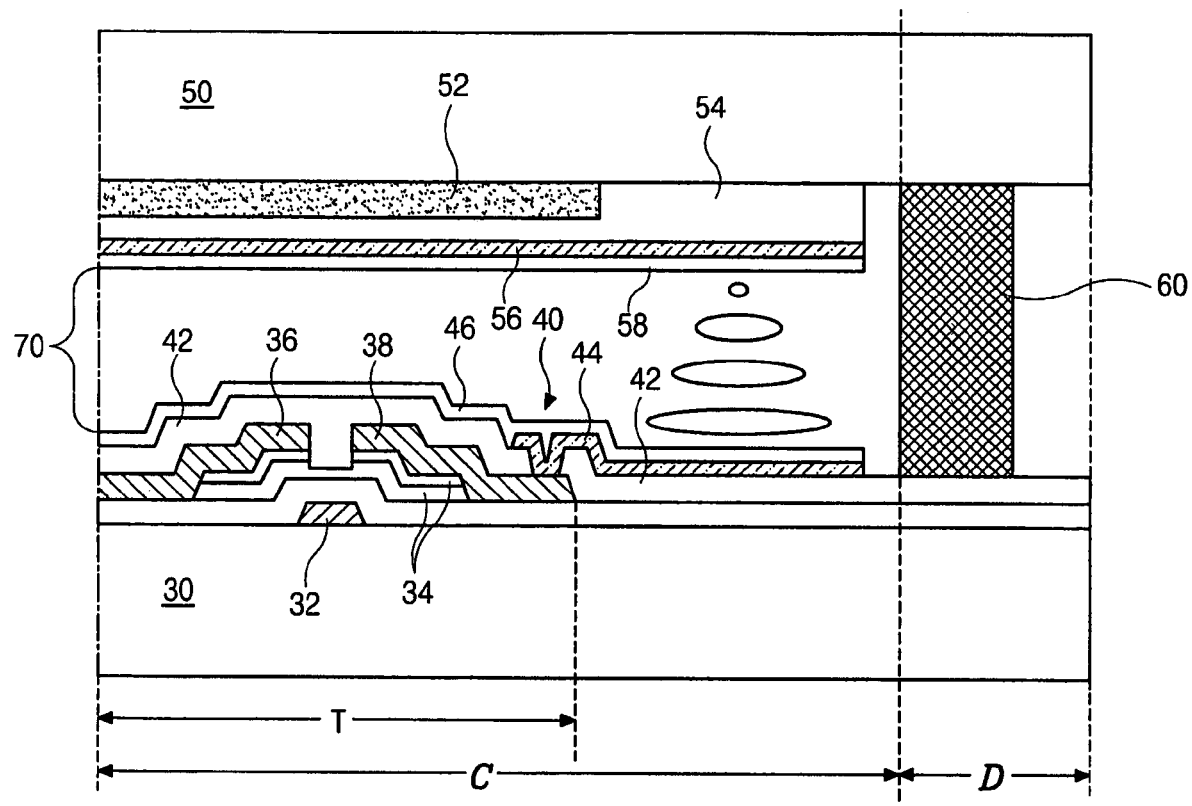
FIG. 3 shows a cross-sectional view of a liquid crystal display device according to the related art.
Figure 4:
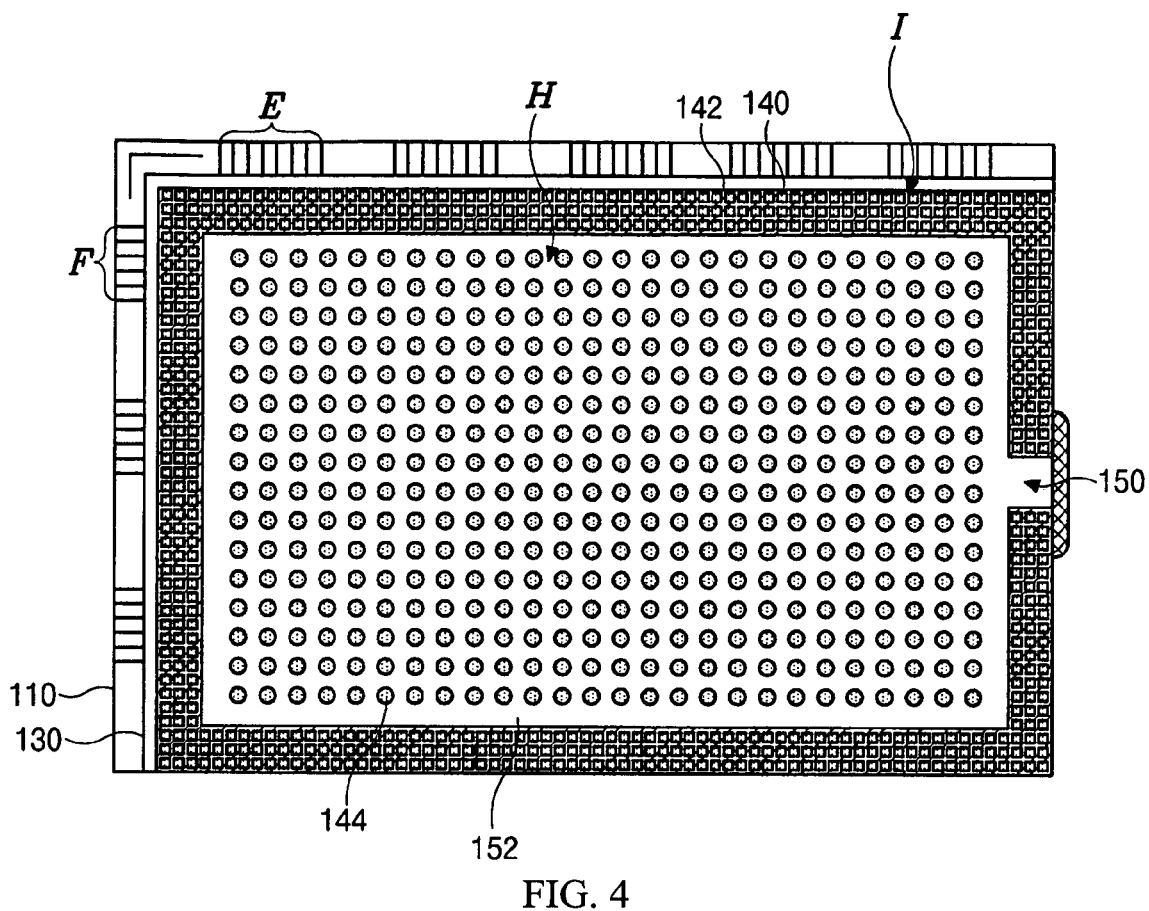
FIG. 4 shows a schematic plan view of a liquid crystal display device according to an aspect of the invention.

FIG. 4 shows a schematic plan view of a liquid crystal display device according to the invention.

FIG. 4 shows a first substrate 110 that has pad portions E and F which are connected to outer circuits at the periphery. A second substrate 130 overlaps the first substrate 110 and exposes the pad portions E and F. Seal patterns 142 are formed at an edge area between the first and second substrate 110 and 130. The seal patterns 142 have a liquid crystal injection hole 150 at a side thereof. An area inside the seal patterns 142 is defined as a display region H, and an area where the seal patterns 142 are formed is defined as a seal pattern region I. In the display region H, a plurality of patterned spacers 144 are formed by a photolithographic process of patterning a photoresist. The plurality of patterned spacers 144 keep the cell gap uniform in the display region H. The patterned spacers 144 are circular in shape, but they are not restricted to a circular shape. The patterned spacers 144 can have any appropriate shape, such as ovals, triangles, squares, rectangles, etc.

In the seal pattern region I, a plurality of supporting patterns 140 are formed from the same material through the same process as the patterned spacers 144, and the supporting patterns 140 are spaced apart from each other. The plurality of supporting patterns 140 function as a supporter of the seal patterns 142.

A liquid crystal layer 152 is interposed between the first and second substrates 110 and 130.

Since the supporting patterns 140 of the invention may serve the same function as the glass fiber, the glass fiber can be omitted. Thus, problems due to the glass fiber abrasion may therefore be prevented, and the manufacturing costs may thus be reduced.

In addition, the supporting patterns 140 are formed of the same material through the same process as the patterned spacers 144, and an additional process is therefore not required.

Figure 5:
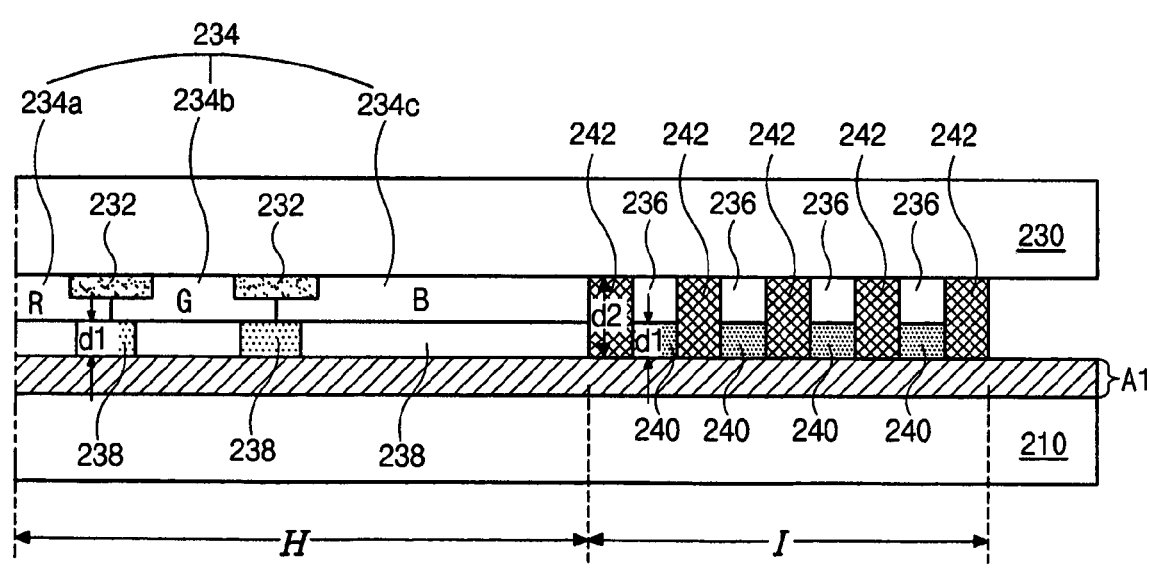
FIG. 5 shows a cross-sectional view of a liquid crystal display device according to a first embodiment of the invention.

FIG. 5 shows a cross-sectional view of a liquid crystal display device according to a first embodiment of the invention. The liquid crystal display device may have an in-plane switching (IPS) mode, in which a pixel electrode and a common electrode are formed over the same substrate, and an electric field parallel to the substrate drives the liquid crystal molecules. For example, two electrodes are formed over an array substrate including a thin film transistor, and no electrode is formed over a color filter substrate. Generally, the seal pattern is formed over the color filter substrate, and thus in the IPS mode liquid crystal display device, the seal pattern may be formed over the substrate without an electrode.

FIG. 5 shows first and second substrates 210 and 230 disposed to face each other. A display region H and a seal pattern region I, which surrounds the display region H, are defined over the first and second substrates 210 and 230.

An array element layer A1 is formed over inner surface of the first substrate 210. Although not shown in detail, the array element layer A1 may include a thin film transistor as a switching element, a pixel electrode connected to the thin film transistor, and a common electrode alternatively arranged with the pixel electrode.

A black matrix 232 is formed over an inner surface of the second substrate 230 in the display region H. A color filter layer 234 is formed over the black matrix 232 in the display region H. The color filter layer 234 contains red (R), green (G) and blue (B) sub-color filters 234a, 234b and 234c, which are sequentially arranged and divided by the black matrix 232. In the seal pattern region I, a plurality of compensating patterns 236, which are spaced apart from each other, are formed of the same material and through the same process as the color filter layer 234. The compensating patterns 236 provide additional support and an even surface to the substrate 230.

A plurality of patterned spacers 238 are formed over the color filter layer 234 corresponding to the black matrix 232. A plurality of supporting patterns 240 are formed over the step-compensating patterns 236. The plurality of supporting patterns 240 are formed of the same material through the same process as the patterned spacers 238. The patterned spacers 238 and the supporting patterns 240 may be formed through a photolithographic process. Alternately, a gravure process can be used. The patterned spacers 238 and the supporting patterns 240 have a first thickness d1.

Seal patterns 242 are formed in the seal pattern region I, and the seal pattern region I includes the supporting patterns 240. The seal patterns 242 have a second thickness d2, which is determined from the first thickness d1.

Figure 6:
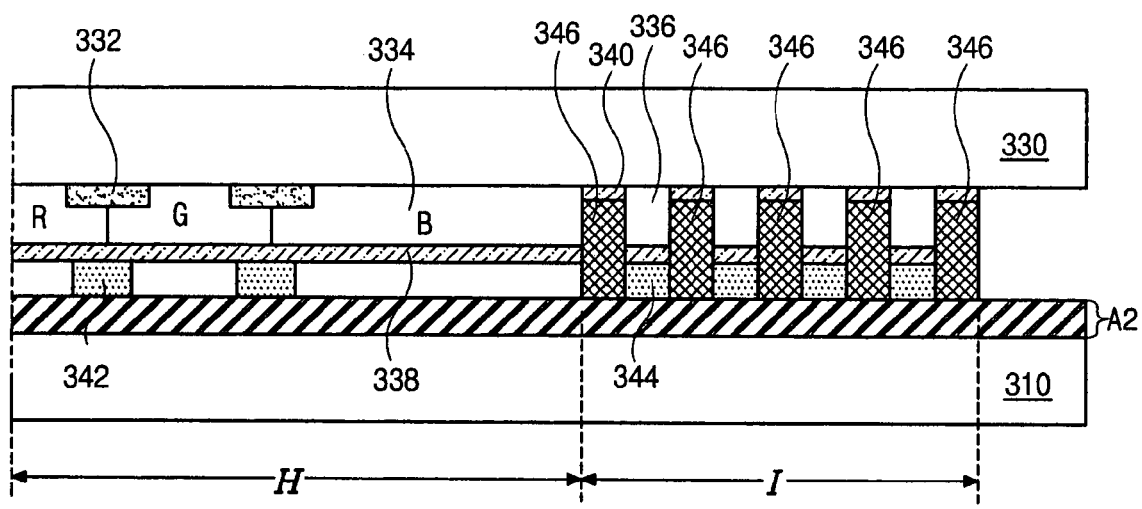
FIG. 6 shows a cross-sectional view of a liquid crystal display device according to a second embodiment of the invention.

FIG. 6 shows a cross-sectional view of a liquid crystal display device according to a second embodiment of the invention. In the second embodiment of the invention, a common electrode is formed over the same substrate as a color filter layer in a fashion similar to a twisted nematic (TN) mode liquid crystal display device. In FIG. 6, an explanation of parts similar to the first embodiment of FIG. 5 may be omitted.

As shown in FIG. 6, an array element layer A2 is formed over an inner surface of the first substrate 310. Although not shown in detail, the array element layer A2 includes a thin film transistor switching element and a pixel electrode connected to the thin film transistor.

A black matrix 332 is formed over an inner surface of a second substrate 330. A color filter layer 334 and step-compensating patterns 336 are formed over the black matrix 332 in a display region H and in a seal pattern region I, respectively. A common electrode 338 is formed over the second substrate 330 in a configuration that includes the color filter layer 334 and the compensating patterns 336. Conductive material patterns 340 made of the same material as the common electrode 338 are formed in the seal pattern region I.

A plurality of patterned spacers 342 are formed over the common electrode 338 corresponding, i.e., opposite, to the black matrix 332. A plurality of supporting patterns 344 are formed over the dual layer of compensating patterns 336 and the conductive material patterns 340. A seal pattern 346 is formed in the seal pattern region I including the supporting patterns 344. The seal pattern 346 is disposed between adjacent stacks of the compensating patterns 336, conductive material patterns 340 and supporting patterns 344.

The first and second substrates 310 and 330 attach to each other by using the seal pattern 346.

In the first and second embodiments, the supporting patterns are formed through the same process as the patterned spacers, and no glass fiber is added to the seal pattern material, thereby reducing manufacturing costs. Moreover, a step, i.e., gap, between the patterned spacers and the supporting patterns is compensated by the step-compensating patterns formed through the color filter forming process, and thus uniformity of the cell gap improves. Because the seal pattern is formed between the adjacent step-compensating patterns and the adjacent supporting patterns, improved adhesive properties of the seal pattern are obtained.

FIGS. 7A to 7D show cross-sectional views of manufacturing processes of the liquid crystal display device according to the second embodiment.

Figure 7A:
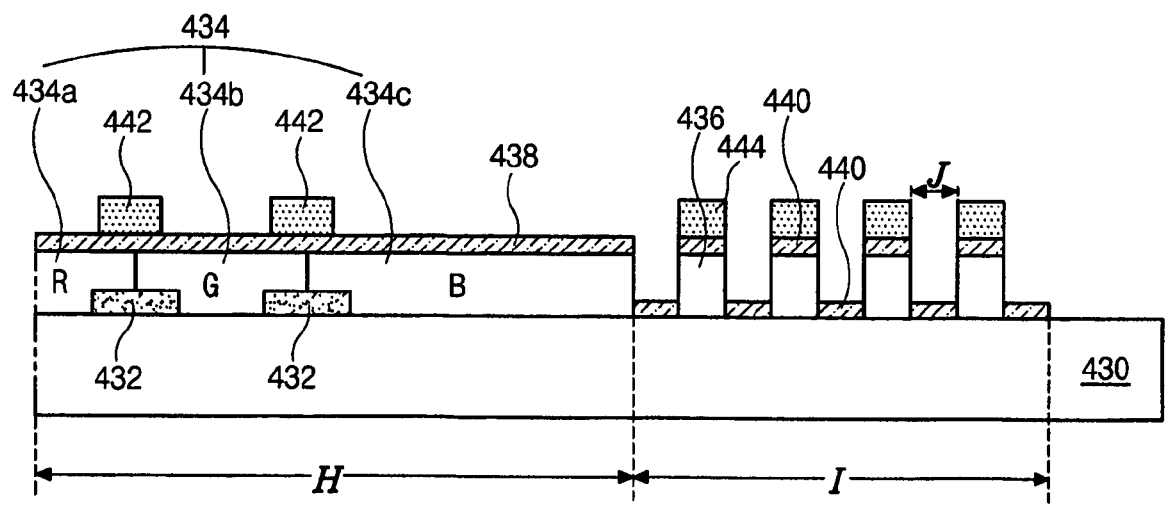
FIGS. 7A to 7D show cross-sectional views of manufacturing processes of the liquid crystal display device according to the second embodiment.

In FIG. 7A, a black matrix 432 is formed over a substrate 430 and is disposed in a display region H. A color filter layer 434 is formed over the black matrix 432 in the display region H, and a plurality of step-compensating patterns 436 are formed in a seal pattern region I, which surrounds the display region H. The color filter layer 434 includes sequentially arranged red (R), green (G) and blue (B) sub-color filters 434a, 434b and 434c. The plurality of step-compensating patterns 436 are formed of the same material and through the same process as the color filter layer 434, and the step-compensating patterns 436 are spaced apart from each other. A conductive material is formed over an entire surface of the substrate 430 including the color filter layer 434 and the step-compensating patterns 436 without a patterning process to form a common electrode 438. At this time, conductive material patterns 440 made of the same material as the common electrode 438 are formed in the seal pattern region I. The electrode material can typically be ITO (indium tin oxide) or IZO (indium zinc oxide).

Next, a plurality of patterned spacers 442 are formed over the common electrode 438 corresponding and opposite to the black matrix 432 through a photolithographic process using an organic material. A plurality of supporting patterns 444 are formed of the same material through the same process as the patterned spacers 442. The plurality of supporting patterns 444 correspond to the compensating patterns 436 in the seal pattern region I.

Seal patterns are later formed in a space J between adjacent compensating patterns 436 and adjacent supporting patterns 444.

Although not shown in the figures, an overcoat layer may be formed after forming the color filter layer 434 and the step-compensating patterns 436.

Figure 7B:
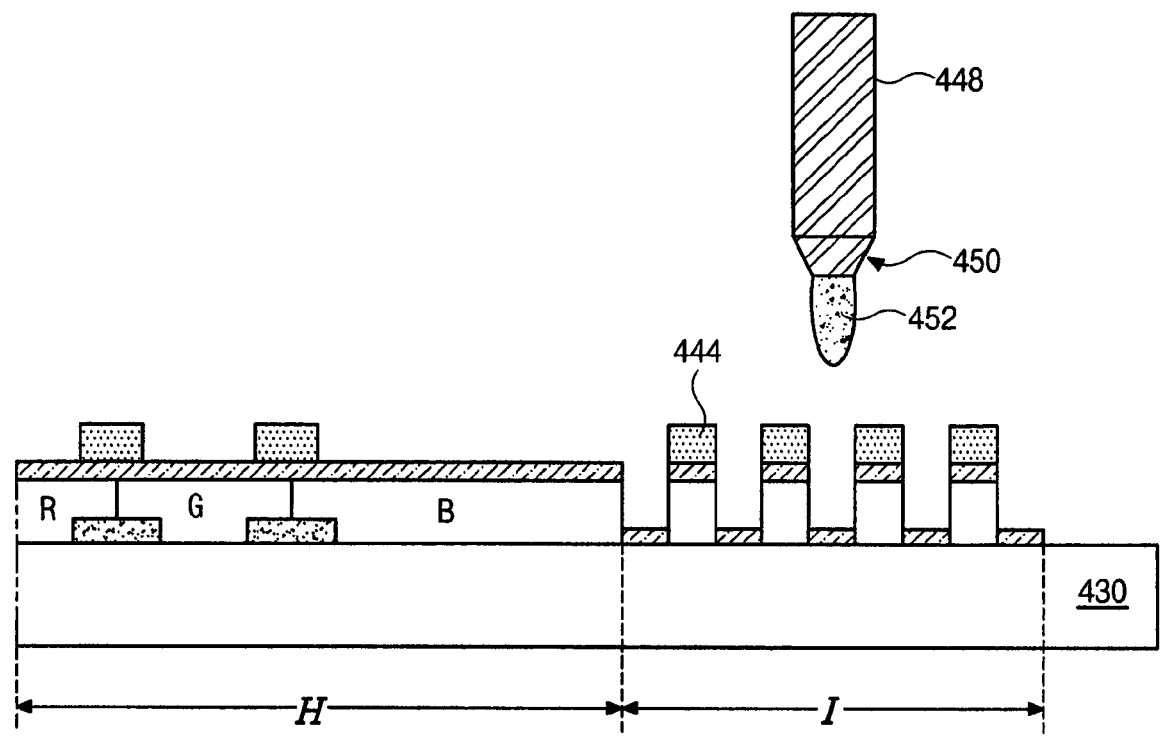
Figure 7C:
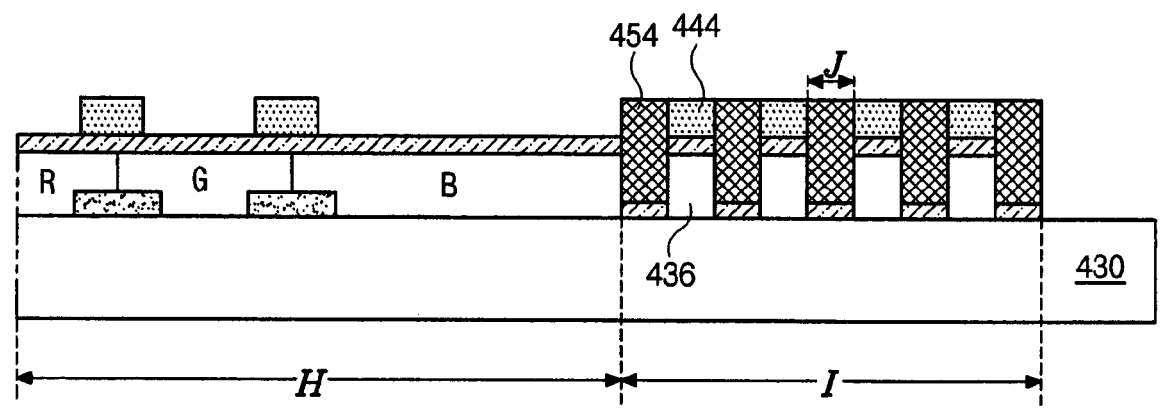

FIGS. 7B and 7C show a seal pattern being formed by a preferred dispensing method. In FIG. 7B, a dispenser 448 is disposed over the seal pattern region I of the substrate 430 that includes the supporting patterns 444. Then, sealant 452 is injected though a nozzle 450, which is a head part of the dispenser 448, and (as shown in FIG. 7C) seal patterns 454 are formed in the seal pattern region I. More particularly, the seal patterns 454 are formed in a space J between adjacent compensating patterns 436 and adjacent supporting patterns 444.

The supporting patterns 444 function as a supporter of the seal patterns 454. As a result, the abrasive glass fiber does not have to be added to the sealant 452 of FIG. 7B. Accordingly, a blending process is not necessary, and bubbles formed from the blending process are prevented.

Figure 7D:
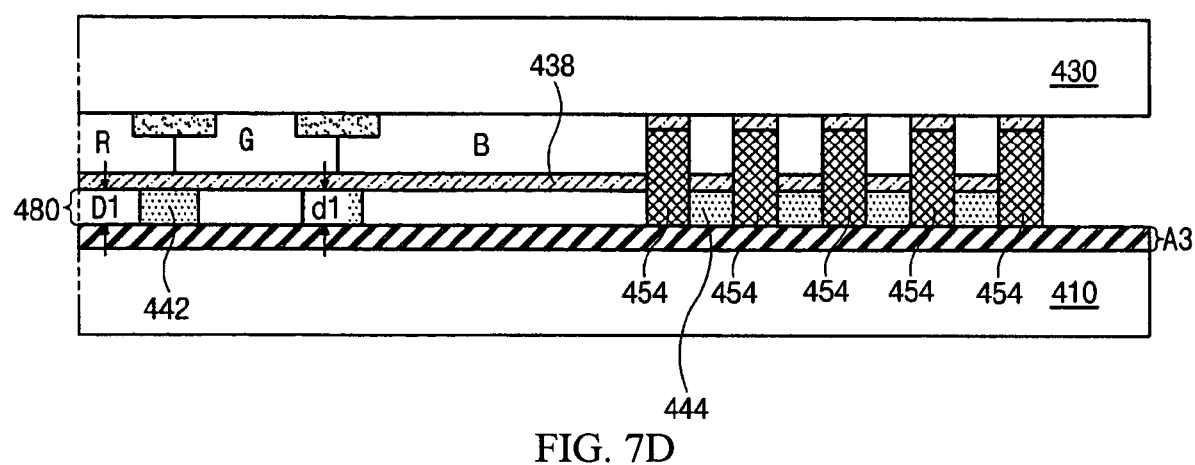

FIG. 7D shows the substrate 430 including the seal pattern 454 being aligned with the other substrate 410 including an array element layer A3, wherein the substrate 430 is disposed over the other substrate 410. The array element layer A3 faces the common electrode 438. The substrates 430 and 410 are attached to each other by using the seal pattern as an adhesive. Next, a liquid crystal layer 480 is interposed between the substrates 410 and 430.

A cell gap D1, which may be defined as a thickness of the liquid crystal layer 480, is determined by the thickness d1 of the patterned spacers 442 and the supporting patterns 444. In the invention, the supporting patterns are used to support of the seal pattern instead of the glass fiber in order to form a seal pattern having a uniform thickness.

The liquid crystal display device including the seal pattern according to the invention has the following effects.

First, because the supporting patterns are formed as a supporter of the seal pattern through the same process as the patterned spacer, glass fiber (or other reinforcing material) added to the sealant may be omitted. Therefore, bubbles formed during the blending process of the glass fiber are prevented, and the life span of the nozzle of the dispenser may be extended to thereby reduce the manufacturing costs.

Second, the step-compensating patterns made of the same material as the color filter layer are formed in the seal pattern region, and thus the step between the spacer and the seal pattern can be compensated.

Third, the seal pattern is formed between adjacent step-compensating patterns and between adjacent supporting patterns, and the adhesion of the seal pattern therefore improves.

It will be apparent to those skilled in the art that various modifications and variations can be made in the fabrication and application of the invention without departing from the spirit or scope of the invention. Thus, it is intended that the invention cover the modifications and variations of this invention provided they come within the scope of the appended claims and their equivalents.

What is claimed is:

1. A liquid crystal display device, comprising:
    a first substrate having a first region and a second region, wherein the second region surrounds the first region;
    a plurality of patterned spacers over the first substrate in the first region;
    a plurality of supporting patterns spaced apart from each other over the first substrate in the second region;
    a plurality of compensating patterns disposed below and aligned with the plurality of supporting patterns;
    a plurality of seal patterns between the plurality of supporting patterns in the second region; and
    a liquid crystal layer between the first and second substrates.

2. The device according to claim 1, further comprising a color filter layer between the first substrate and the plurality of patterned spacers, wherein the color filter layer is composed of red, green and blue sub-color filters.

3. The device according to claim 2, wherein the plurality of compensating patterns are formed of a same material as the color filter layer.

4. The device according to claim 2, further comprising a black matrix between the sub-color filters.

5. The device according to claim 4, wherein the plurality of patterned spacers corresponds to the black matrix.

6. The device according to claim 2, further comprising a common electrode between the patterned spacers and the color filter layer.

7. The device according to claim 6, further comprising a plurality of conductive material patterns between the supporting patterns and the first substrate, wherein the plurality of conductive material patterns are formed of a same material as the common electrode.

8. The device according to claim 6, further comprising an array element layer over an inner surface of the second substrate, wherein the array element layer includes a pixel electrode.

9. The device according to claim 2, further comprising a plurality of black matrix portions only in the first region, each black matrix portion being formed in between adjacent sub-color filters, wherein each black matrix portion corresponds to a particular patterned spacer of the plurality of patterned spacers.

10. The device according to claim 1, further comprising an array element layer over the second substrate, wherein the array element layer includes a pixel electrode and a common electrode.

11. The device according to claim 1, wherein the plurality of supporting patterns are formed of a same material as the plurality of patterned spacers.

12. The device according to claim 1, wherein a thickness of the liquid crystal layer is defined as a cell gap, which is determined by thicknesses of the patterned spacers and the supporting patterns.

13. The device according to claim 1, wherein the supporting patterns act as a supporter of the seal patterns.

14. The device according to claim 1, wherein the seal patterns contain no glass fibers.

15. The device according to claim 1, wherein each supporting pattern and the corresponding compensating pattern are in physical contact with at least one adjacent seal pattern.

16. The device according to claim 1, wherein the plurality of supporting patterns and the plurality of compensating patterns are arranged in a checkered pattern.

17. The device according to claim 1, wherein each compensating pattern is in physical contact with and directly above the corresponding supporting pattern.

18. The device according to claim 1, wherein a thickness of the patterned spacers is the same as a thickness of the supporting patterns.

19. A method of manufacturing a liquid crystal display, comprising:
    forming a plurality of patterned spacers in a first region and a plurality of supporting patterns in a second region over a first substrate, wherein the second region surrounds the first region;
    forming a plurality of compensating patterns disposed below and aligned with the plurality of supporting patterns;
    forming a plurality of seal patterns between the plurality of supporting patterns in the second region;
    disposing the first substrate over the second substrate and attaching the first and second substrate by using the seal pattern; and
    injecting a liquid crystal material between the first and second substrates.

20. The method according to claim 19, wherein a cell gap defined by a thickness of the liquid crystal layer is determined by thicknesses of the patterned spacers and the supporting patterns.

21. The method according to claim 19, further comprising a step of forming a color filter layer before forming the plurality of patterned spacers and supporting patterns, wherein the color filter layer is composed of red, green and blue sub-color filters.

22. The method according to claim 21, wherein forming the plurality of compensating patterns is simultaneously performed with forming the color filter layer.

23. The method according to claim 21, further comprising forming a black matrix before forming the color filter layer, wherein the black matrix corresponds to an interface between the sub-color filters.

24. The method according to claim 21, further comprising forming a plurality of black matrix portions only in the first region such that each black matrix portion is located in between adjacent sub-color filters, wherein each black matrix corresponds to a particular patterned spacer of the plurality of patterned spacers.

25. The method according to claim 21, further comprising forming a common electrode over the color filter layer prior to forming the plurality of patterned spacers and the plurality of supporting spacers.

26. The method according to claim 21, further comprising forming a plurality of conductive material patterns in the second region over the plurality of compensating patterns prior to forming the plurality of patterned spacers and the plurality of supporting patterns, wherein each compensating pattern has a conductive material pattern formed over it.

27. The method according to claim 26, wherein the step to form the plurality of conductive material patterns is also performed prior to forming the plurality of seal patterns in the second region such that the conductive material patterns are formed over the first substrate in the second region corresponding to the locations of the plurality of seal patterns.

28. The method according to claim 19, wherein the seal pattern is formed by one of a screen-printing method and a dispensing method.

29. The method according to claim 19, wherein each seal pattern is disposed between adjacent compensating patterns and between adjacent supporting patterns.

30. The method according to claim 19, wherein the seal patterns contain no glass fibers.

31. The method according to claim 19, wherein each compensating pattern is in physical contact with and directly above the corresponding supporting pattern.

32. The method according to claim 31, wherein each seal pattern is in physical contact with at least one adjacent compensating pattern and its corresponding supporting pattern.

33. The method according to claim 19, wherein the plurality of supporting patterns and the plurality of compensating patterns are arranged in a checkered pattern.

34. The method according to claim 19, wherein a thickness of the patterned spacers is the same as a thickness of the supporting patterns.

* * * * *